July 23, 1963  W. E. NUSBAUM  3,098,384
FLOW METER
Filed May 16, 1961  2 Sheets-Sheet 1
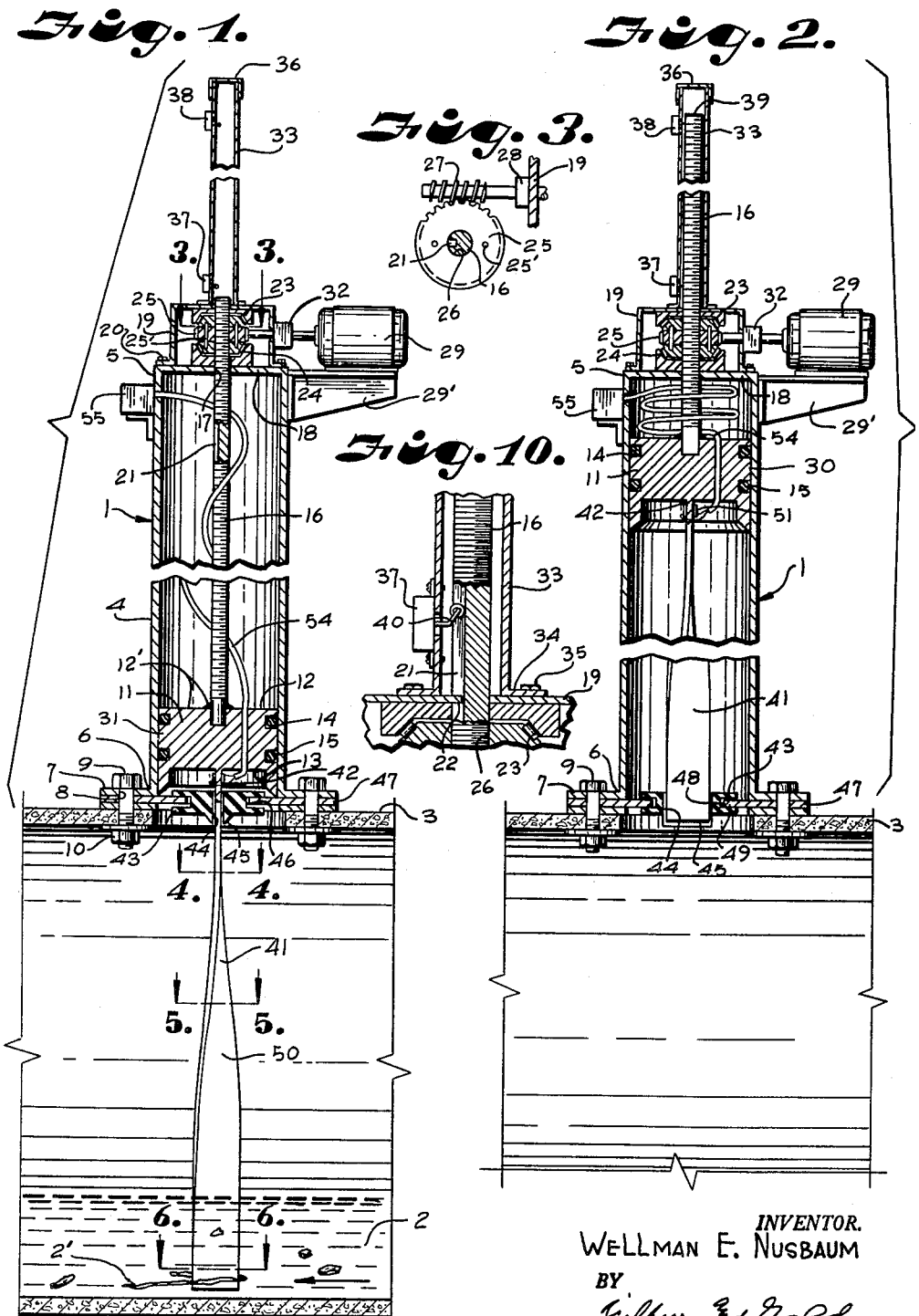
INVENTOR.
WELLMAN E. NUSBAUM
BY
Fishburn and Gold
ATTORNEYS July 23, 1963 W. E. NUSBAUM 3,098,384
FLOW METER
Filed May 16, 1961 2 Sheets-Sheet 2

INVENTOR.
WELLMAN E. NUSBAUM
BY
*Fishburn & Gold*
ATTORNEYS

United States Patent Office 3,098,384
Patented July 23, 1963

3,098,384
FLOW METER
Wellman E. Nusbaum, 8008 Ensley Lane, Leawood, Kans.
Filed May 16, 1961, Ser. No. 110,371
5 Claims. (Cl. 73—228)

This invention relates to flow measuring devices, and more particularly to a self-cleaning flow meter which is adapted to measure sewage flow.

It is often necessary to accurately measure the flow through sanitary and storm sewers for several reasons, for example, to obtain design information for constructing sewer systems or to properly determine the proportionate share of installation and maintenance costs which should be borne by different communities in the system. The measurement of sewage flow, however, is generally accompanied by unusual conditions incompatible with conventional flow measuring devices. Sewage often contains a great variety of debris, ranging from small solid particles to paper, rags, sticks and occasionally large objects such as logs and boulders. Also, in contrast to the flow patterns in the majority of fluid conducting systems, the pipes or conduits carrying sewage are usually not filled but yet must be adapted to carry vastly increased flow during storm conditions. Another peculiarity related to sewage systems is that during periods of high tide or high river level, the direction of flow through sewer lines sometimes reverses or ceases although the conduit is partially or completely filled.

Conventional flow measuring devices of the differential producing type, such as venturi meters, flow tubes, orifice plates and magnetic flow meters, require that the sensing element be full during measurement, thus making them generally impractical for metering sewage flow. Other conventional flow measuring devices such as Parshall flumes require a special configuration of the flow channel and are thus awkward and expensive in the ordinary sewer line application. Flow measuring devices which use floats have been adapted for use with sewage systems, but such devices indicate a false forward flow when the sewage is not flowing or flow direction has reversed, for example, due to high downstream water level. The pendant vane type of flow meter, as well as the float gage and the differential producers, is generally adversely affected by the debris in sewage lines which tends to clog passageways, drag float elements beneath the liquid surface, interfere with the rotation of fans or propellers, and alter the profile and characteristics of pendant vanes.

It is, therefore, the principal objects of the present invention to provide: a simple flow measuring device which is adapted to accurately measure flow under conditions found in sanitary and storm sewers; to provide such a device which functions either in conventional closed pipes or open channels; to provide a sewage flow meter which operates in conduits which are either filled or partially filled; to provide such a device which is self-cleaning; to provide a flow meter which may be programmed to periodically remove debris from the sensitive element thereof; to provide a simple flow measuring device which measures flow through a conduit in either direction; to provide an apparatus for measuring the rate of flow of liquids which will present a zero flow reading when flow is not present although the conduit contains liquid; to provide such a device which is easily adapted to use with sealed or pressure systems; to provide a liquid flow detector using a fixed blade as the flow sensing element, which blade operates on the force restraining principle; to provide such a device wherein the blade is pitched, twisted or otherwise altered in profile to characterize the meter for particular applications; to provide a fixed flow sensing blade using strain gages as transducers; and to provide a flow meter apparatus and method wherein a flow sensing blade is periodically withdrawn from the flowing medium for cleaning.

Other objects and advantages of this invention will become apparent from the following description taken in connection with the accompanying drawings wherein are set forth by way of illustration and example certain embodiments of this invention.

FIG. 1 is a sectional view through the flow meter showing the sensing blade in the lower or operating position.

FIG. 2 is a sectional view through the flow meter showing the blade in the upper or withdrawn position.

FIG. 3 is a fragmentary sectional view on an enlarged scale taken on the line 3—3, FIG. 1, showing the worm gear for withdrawing the blade.

FIG. 10 is a fragmentary sectional view through the blade housing showing the guide groove in the withdrawing rod.

Figure 4:
FIG. 4 is a sectional view through the blade on an enlarged scale taken on the line 4—4, FIG. 1, showing the pitch therein.
Figure 5:
FIG. 5 is a sectional view through the blade on an enlarged scale taken on the line 5—5, FIG. 1, showing the pitch therein.
Figure 6:
FIG. 6 is a sectional view through the blade on an enlarged scale taken on the line 6—6, FIG. 1.
Figure 7:
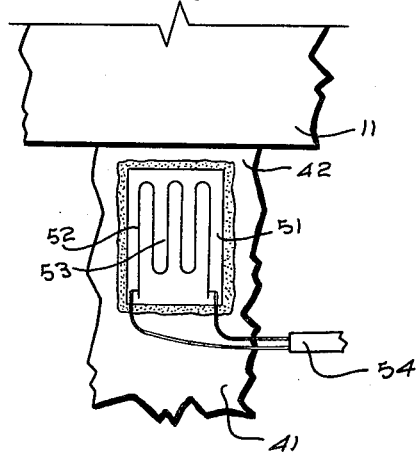
FIG. 7 is a fragmentary view in side elevation on an enlarged scale showing a wire strain gage bonded to the root of the blade.

Referring to the drawings in more detail:

The reference numeral 1 indicates generally the flow meter of this invention here illustrated as adapted to measure the flow of sewage 2 normally containing miscellaneous debris 2' and flowing through a conduit or sewer pipe 3 in the direction indicated by the arrow in FIG. 1. The flow meter 1 is comprised of a rigid elongated vertically extending supporting member or housing 4 having an upper end 5 and a lower end 6. The housing 4 is of hollow cylindrical shape and exhibits an annular radially extending flange 7 at the lower end 6 thereof. The flange 7 contains suitable bores 8 for receiving bolts 9 which extend therethrough and through the wall of the sewer pipe 3 and carry nuts 10 for securing the housing 4 in fixed relation to the sewer pipe with the lower end 6 pointing downwardly toward the sewage 2.

A piston 11 is contained in the housing 4 and exhibits an upper side 12 and a lower side 13. The piston 11 is adapted to slide vertically in the housing 4 while being guided thereby. In the illustrated example, the piston 11 has a pair of annular grooves 14 containing suitable resilient O-ring seals 15 adapted to engage both the housing 4 and the piston 11 to provide a seal therebetween to prevent the escape of liquids or gases within the sewer pipe 3 and introduced into the housing 4 beneath the piston 11. It is noted that a seal is maintained also between the flange 7 and the sewer pipe 3.

An elongated, helically threaded withdrawal member or rod 16 is fixed to the piston upper side 12, for example, by welding at 12', and extends upwardly therefrom and axially of the housing 4. The rod 16 extends through an opening 17 in the cover 18, which closes the upper end of the housing 4, and into the hollow interior of a cap 19 secured to the housing 4 by means of suitable screws 20. The rod 16 contains a guide groove or slot 21 extending longitudinally thereof and engaging with a fixed lug 22 on the cap 19 which permits longitudinal movement of the rod 16 but prevents rotational movement thereof. An upper roller bearing 23 and a lower roller bearing 24 are contained in spaced apart relation within the hollow interior of the cap 19 and retain a worm gear 25 therebetween by suitable means such as pins 25′. The roller bearings 23 and 24 support the worm gear 25 axially of the housing 4 for rotation in a horizontal plane. A bore 26 extends vertically and axially through the worm gear 25 and helical threads are formed therein which engage the threaded rod 16, as best illustrated in FIG. 10.

A worm 27 is maintained in engagement with the worm gear 25 by means of a suitable bearing 28 secured to the cap 19. A reversible motor 29, supported by the housing 4 through a suitable bracket 29′, is adapted to selectively rotatively drive the worm 27 in opposite directions to cause an axial reciprocation of the piston 11 between an upper housing position 30 illustrated in FIG. 2 and a lower housing position 31 illustrated in FIG. 1. A torque switch 32, the purpose of which is described more fully hereinafter, is operatively connected between the motor 29 and the worm 27 to de-energize the motor in case of torque overload.

A vertically extending sleeve 33 is axially positioned with respect to the housing 4 and exhibits an annular flange 34 at the lower end thereof. The flange 34 has suitable screws 35 extending therethrough and into the cap 19 to retain the sleeve 33 fixed thereon. A suitable protective cap 36 covers the top of the sleeve 33 and acts to prevent airborne dust and the like from entering thereinto. The sleeve 33 is adapted to receive the rod 16 thereinto when the piston 11 is traveling upwardly toward the upper position 30.

Switches 37 and 38 are secured to the sleeve 33 in spaced apart relation, the switch 38 being located adjacent the uppermost limit of travel of the upper end 39 of the rod 16 and the switch 37 being located adjacent the lowermost position assumed by the rod end 39. Each of the switches 37 and 38 are of the return biased double pole type and exhibit an actuating arm 40 which extends into the sleeve 33 and is adapted to contact the rod 16 to actuate the respective switches as the rod end 39 passes thereby. The purpose and operation of the switches 37 and 38 will be described hereinafter.

A vertically disposed cantilever sensing blade 41 is firmly supported or fixed at the root or upper end portion 42 thereof to the piston lower side 13 and extends downwardly therefrom substantially axially of the housing 4. As illustrated, the blade 41 is integral with the piston 11, but other means of providing a fixed joint may be used without departing from the scope of this invention. The blade 41 extends past the housing lower end 6 when the piston 11 is in the lower position 31 and enters the sewage 2, as indicated in FIG. 1. When the piston 11 is in the upper position 30, the blade 41 is withdrawn from the sewage 2 and substantially completely enters into the housing 4, as indicated in FIG. 2.

A wiping member 43, preferably of resilient material, contains a slot 44 extending vertically transversely therethrough which is adapted to slidably receive the blade 41. The wiping member 43, in the example shown, exhibits a pair of lips 45 adjacent the slot 44 and urged into resilient wiping contact with the blade 41. The wiping member 43 also exhibits an annular groove 46 extending around the periphery thereof and in a plane transverse to the axis of the housing 4. A mounting plate 47 is rigidly secured adjacent the housing end 6 by means of the bolts 9 and contains a bore 48 therethrough for receiving the wiping member 43. The inner edges 49 which form the bore 49 extend into the groove 46 and restrain the wiping member 43 from motion axially of the housing 4 but permit same to rotate for a purpose which will become apparent hereinafter. When the blade 41 is moved upwardly by raising the piston 11 to the upper position 30, the lips 45 wipe the surface 50 of the sensing blade 41 and clean sewage debris 2′ therefrom which drops back into the sewage 2 to be carried downstream, FIG. 2.

The sensing blade 41 operates on the force restraining principle to measure fluid flow. To accomplish this, a set of suitable force measuring devices or transducers such as a pair of waterproofed strain gages 51 are bonded to the blade root or upper end portion 42 adjacent the piston 11 whereby liquid flow may be measured as a function of the strain on the blade 41. In the illustrated example, the strain gages 51 are of the popular type known as "SR–4" manufactured by the Baldwin-Lima-Hamilton Corporation of Waltham, Massachusetts; however, other strain measuring devices may be used to equal advantage. The gages 51 consist of a length of very fine wire 52 arranged in the form of a grid 53 extending longitudinally of the blade 41. A change in the length of the grid 53 caused by the slight stretching of the surface of the blade 41 due to elastic bending will produce a proportional change in its electrical resistance which can be monitored and related to flow as described hereinafter. The strain gages 51 are connected by means of a shielded cable 54 to an indicating, monitoring and recording device 55 of any one of several types well known to those skilled in the art, for example, the "Strip-Chart Recorder Type 4" and associated equipment manufactured by the Baldwin-Lima-Hamilton Corporation, supra.

Figure 8:
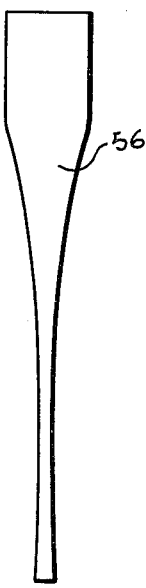
FIG. 8 is a view in side elevation showing another form of sensing blade.

The blade 41, as illustrated in FIGS. 1 and 2, is pitched or twisted to characterize or calibrate the flow meter 1. It is apparent that as the sewage 2 flows against the sensing arm 41, a moment is developed which is the product of the flowing force of the sewage 2 striking the blade and the effective length of the blade. As the level of the sewage 2 rises, the effective length of the moment arm formed by the blade, in relation to the incremental change in level of the sewage 2, is less. Therefore, the twisted configuration of the sensing blade 41 compensates for the variation in effective length of the moment arm caused by differences in sewage depth to develop a measurement in direct proportion to the rate of flow. The degree of pitch or twist must often be modified in order to obtain a moment proportional to the volume rate of flow as effected by the particular cross-sectional configuration of the conduit or sewer pipe. That is, the volume rate of flow in a cylindrical pipe will vary with depth at a different rate than an oval or square conduit. The blade configuration required for a particular application may be obtained by one skilled in the art with well known empirical procedures or by mathematical analysis. Other sensing blade configurations, such as the blade 56 illustrated in FIG. 8, may be used to characterize or calibrate the system by compensating for effective moment arm and conduit configuration. If desired, a portion of the characterization or calibration, such as compensation for conduit configuration, may be achieved electronically by using non-linear circuitry in the indicating and recording device 55.

As noted above, the wiping member 43 is permitted to rotate axially of the housing 4 while being restrained from longitudinal movement thereof. This permits the wiping member 43 to follow the contour of a twisted sensing blade as it is raised to achieve an efficient wiping action.

Figure 9:
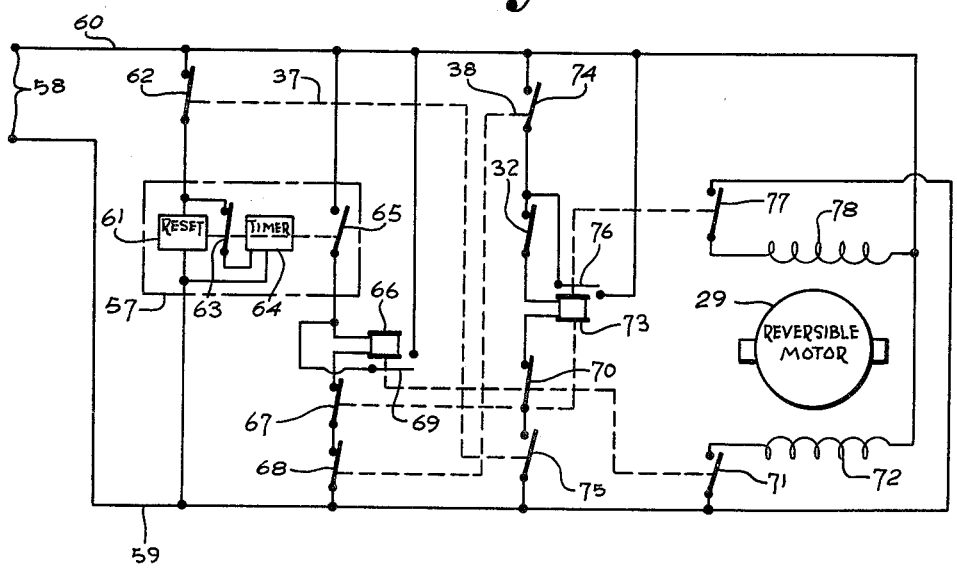
FIG. 9 is a schematic wiring diagram of an electrical system for programming the automatic periodic cleaning of the blade.

It is highly desirable that the flow meter 1 require as little maintenance and attention as possible and yet produce reliable and accurate records of sewage flow. To achieve this, apparatus is provided for energizing the reversible motor 29 in a manner whereby the blade 41 is periodically cleaned. One form of such apparatus is shown schematically in FIG. 9 and comprises an electrical circuit containing a timer switch 57 of the type which can be set for an operating period of ten minutes to ten hours, for example, the "Cycl-Flex Type HP–2" manufactured by the Eagle Signal Corporation, Moline, Illinois, however, it is to be understood that timer switches offering shorter or longer periods may be required for particular applications. A source of electrical power 58 such as 110 volts A.C. is connected across power conducting wires or lines 59 and 60. The reset device 61 of the timer switch 57 is connected between the lines 59 and 60 but is interrupted with switch contacts 62. The contacts 62 are contained in the switch 37 and are adapted to close only when the sensing blade 41 is in the lowered position, as indicated in FIG. 1. The subsequent opening of the contacts 62 causes the reset device 61 to close the contacts 63 operatively connected thereto and open the contacts 65 also operatively connected thereto and connected between the lines 59 and 60. The next closing of the contacts 62 starts the timer device 64, and contacts 63 open and contacts 65 close after the timer device 64 has timed the desired period.

The coil of a magnetic relay 66 is connected between the contacts 65 and the line 59; however, the circuit between the relay 66 and the line 59 is further interrupted by safety interlock contacts 67 and contacts 68 which are contained in the switch 38 and are adapted to open when the blade 41 is raised to the position indicated in FIG. 2.

When the circuit is completed through the contacts 65, 67 and 68, the relay 66 is actuated to close a set of contacts 69 which bypasses the contacts 65 to permit the relay 66 to remain energized, although the contacts 65 are opened as noted above. The energizing of the relay 66 also opens safety interlock contacts 70 and closes contacts 71. The contacts 71 when closed introduce power to the reversible motor winding 72 which acts to drive the blade 41 upwardly. Also connected across the lines 59 and 60 is a magnetic relay 73, however, the circuit thereto is interrupted by contacts 74, torque switch 32, safety interlock contacts 70 and contacts 75 respectively connected in series. The contacts 74 are contained within the switch 38 (along with the contacts 68) and are adapted to close when the blade 41 reaches its uppermost position as indicated in FIG. 2. The contacts 75 are contained within the switch 37 (along with the contacts 62) and are adapted to open when the blade 41 reaches the lowermost position thereof, as indicated in FIG. 1. When the relay 73 is energized, a set of contacts 76 are closed whereby the relay will remain energized although the contacts 74 open due to the downward displacement of the rod 16 causing the blade 41 to begin its downward journey. The actuation of the relay 73 also opens the safety interlock contacts 67 and closes the contacts 77, which latter contacts permit energizing the reversible motor winding 78 to operate the motor 29 in a direction which lowers the blade 41.

By way of explanation, it is to be assumed that the sensing blade is in the lowered position, as indicated in FIG. 1. The contacts 62 are closed due to the rod 16 being out of contact with the switch 37. The contacts 63 are closed, energizing the timer 64 and the contacts 65 are opened. At the end of the timing period, the timer device 64 causes the contacts 63 to open, de-energizing itself and causing the contacts 65 to close. When the rod 16 begins its upward journey, the switch 37 is contacted thereby to open the contacts 62 which, in turn, causes the reset device 61, after a timed period, to close the contacts 63 to prepare for timing the next period and open the contacts 65. As the contacts 65 close due to the operation of the timer device 64, the relay 66 is energized through the contacts 67 and 68. When the relay 66 is energized, the contacts 69 close to bypass the contacts 65 and seal in the circuit to the relay 66. The energizing of the relay 66 also opens contacts 70 to prevent an accidental energizing of the raising windings 72 and the lowering windings 78 at the same instant. The energizing of the relay 66 in addition closes the contacts 71 which causes the reversible motor 29 to raise the blade 41. When the sensing blade 41 reaches its uppermost position as indicated in FIG. 2, the contacts 68 contained in the switch 38 open causing the relay 66 to de-energize which, in turn, opens the contacts 71 stopping the motor 29 and closing the safety interlock contacts 70. The contacts 74 close when the blade 41 reaches its uppermost position but do not energize the relay 73 until the contacts 70 are closed. Note that the closing of the contacts 70 and the closing of the contacts 74 occur almost simultaneously so that as soon as the sensing blade 41 reaches the fully raised position, as indicated in FIG. 2, it automatically starts to lower. The closing of the contacts 74 contained in the switch 38 thus energizes the relay 73 which, in turn, closes the contacts 76 to cause the relay 73 to remain energized although the contacts 74 subsequently open as soon as the blade 41 starts downwardly. The torque switch 32 remains closed at all times unless the blade 41 strikes an object or the system otherwise malfunctions to put an abnormal torque load on the motor 29 in which case the torque switch 32 will open, putting the entire programming system out of operation until an inspection and correction is made. When the blade 41 reaches the lowermost position, the contacts 75 contained in the switch 37 open causing the motor 29 to stop. Occurring simultaneously with the opening of the contacts 75 is the closing of the contacts 62 also contained in the switch 37, causing the timer switch 57 which has previously reset to start timing again. During the timing period, the sensing blade 41 remains in its lowered position for metering the flow of sewage 2 through the sewer pipe 3.

The configuration of the flow meter described above provides a device which is adaptable to accurately measure laminar or turbulent flow and which senses flow in either direction. There is a low head loss through the meter and any degree of sensitivity may be provided depending upon the particular type and sensitivity of strain measurement.

The flow meter described herein has been illustrated as used in connection with a closed sewer pipe containing sewage. However, it is to be understood that the device is also useful in measuring flow through open channels or the like and with media other than sewage.

It is to be further understood that while I have illustrated and described one form of my invention, it is not to be limited to the specific form or arrangement of parts herein described and shown except insofar as such limitations are included in the claims.

What I claim and desire to secure by Letters Patent is:

1. A flow meter adapted to measure the flow of liquids containing debris through a conduit comprising, an elongated flow sensing blade, means for firmly supporting said blade at least partially submerged in the flow of liquid, means associated with said sensing blade for measuring liquid flow as a function of strain on said sensing blade caused by liquid flow, means cooperating with said supporting means and adapted to automatically periodically withdraw said blade from the liquid, and a wiping device adapted to clean said blade as it is withdrawn whereby debris is removed from said blade.

2. A flow meter for measuring fluid flow containing debris in a conduit comprising, a rigid supporting member, said supporting member having an upper and a lower end, means adjacent said lower end for securing said supporting member in fixed relation to said conduit, a reciprocating device cooperating with and guided by said supporting member, means adapted to selectively reciprocate said reciprocating device between an upper and a lower position with respect to said supporting member, a sensing blade secured to said reciprocating device, means associated with said sensing blade for measuring liquid flow as a function of sensing blade response to liquid flow, said blade being constructed and arranged to extend into the fluid when said reciprocating device is in the lower position and withdraw from the fluid when said reciprocating device is in the upper position, a wiping member adjacent said supporting member lower end, and means restraining said wiping member from reciprocation upwardly with respect to said supporting member, said wiping member being adapted to clean debris from said blade during the upward reciprocation thereof.

3. A flow meter adapted to measure the flow of sewage containing debris in a conduit comprising; a rigid elongated vertically extending housing, said housing having an upper and a lower end and being of hollow cylindrical shape, means for securing said housing in fixed relation to said conduit with said lower end pointing downwardly toward the sewage, a piston in said housing and having an upper side and a lower side, said piston being adapted to slide vertically in said housing while being guided thereby, reversible means adapted to cause axial reciprocation of said piston between an upper and a lower position with respect to said housing, a characterized sensing blade fixed to said piston lower side and extending downwardly therefrom and axially of said housing, said blade being constructed and arranged to extend past said housing lower end and into the sewage when said piston is in the lower position and withdraw from the sewage and substantially completely into said housing when said piston is in the upper position, transducing means operatively connected to said blade for sensing the strain thereon due to the sewage flow thereagainst, a wiping member adjacent to and partially closing said housing lower end, means for restraining said wiping member from motion axially of said housing, said wiping member being adapted to clean sewage debris from said blade during upward movement thereof, and means for periodically energizing said reversible means whereby said blade is periodically cleaned.

4. The apparatus of claim 3 wherein sealing means are provided between said piston and said housing.

5. The apparatus of claim 3 including a helically threaded rod fixed to said piston upper side and extending upwardly and axially of said housing, a worm gear, means for rotatably mounting said worm gear adjacent said housing upper end and axially of said housing and for rotation in a horizontal plane, a bore extending vertically and axially through said worm gear and forming helical threads engaging said threaded rod, and a worm engaging said worm gear and adapted to be driven by said reversible means to cause said axial reciprocation.

References Cited in the file of this patent
UNITED STATES PATENTS

| | | |
|---|---|---|
| 1,770,300 | Davis | July 8, 1930 |
| 2,683,369 | Brewer | July 13, 1954 |
| 2,928,114 | Ballard | Mar. 15, 1960 |
| 2,989,866 | Widell et al. | June 27, 1961 |